United States Patent
Friman et al.

(10) Patent No.: US 9,703,752 B2
(45) Date of Patent: Jul. 11, 2017

(54) CACHING IN MOBILE NETWORKS

(75) Inventors: Erik Friman, Stockholm (SE); Åke Arvidsson, Solna (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 621 days.

(21) Appl. No.: 14/346,979

(22) PCT Filed: Sep. 30, 2011

(86) PCT No.: PCT/EP2011/067171
§ 371 (c)(1),
(2), (4) Date: Mar. 25, 2014

(87) PCT Pub. No.: WO2013/044987
PCT Pub. Date: Apr. 4, 2013

(65) Prior Publication Data
US 2014/0237071 A1  Aug. 21, 2014

(30) Foreign Application Priority Data
Sep. 28, 2011  (GB) .................................. 1116737.6

(51) Int. Cl.
*G06F 15/167*  (2006.01)
*G06F 15/173*  (2006.01)
(Continued)

(52) U.S. Cl.
CPC .. *G06F 15/17331* (2013.01); *G06F 17/30902* (2013.01); *H04L 67/2847* (2013.01)

(58) Field of Classification Search
CPC ......... G06F 17/30902; G06F 15/17331; G06F 15/17325; G06F 15/17306; G06F 15/17;
(Continued)

(56) References Cited

U.S. PATENT DOCUMENTS 6,487,641 B1    11/2002  Cusson et al.
7,483,915 B2 *   1/2009  Thompson ................ G06F 8/24
(Continued)

FOREIGN PATENT DOCUMENTS

CN   101331488 A   12/2008
CN   101431530 A    5/2009
(Continued)

OTHER PUBLICATIONS

Chae, Y. et al., "Silo, Rainbow, and Caching Token: Schemes for Scalable, Fault Tolerant Stream Caching", IEEE Journal on Selected Areas in Communications, Sep. 1, 2002, pp. 1328-1344, vol. 20, Issue: 7, IEEE.

*Primary Examiner* — Davoud Zand
(74) *Attorney, Agent, or Firm* — Coats & Bennett, P.L.L.C.

(57) ABSTRACT

There is described a method for optimizing the distribution of data objects between caches in a cache domain of a resource limited network. User requests for data objects are received at caches in the cache domain. A notification is sent from each cache at which a request is received to a cache manager. The notification reports the user request and identifies the requested data object. At the cache manager, object information including the request frequency of each requested data object and the locations of the caches at which the requests were received is collated and stored. At the cache manager, objects for distribution within the cache domain are identified on the basis of the object information. Instructions are sent from the cache manager to the caches to distribute data objects stored in those caches between themselves. The objects are classified into classes according to popularity, the classes including a high popularity class comprising objects which should be distributed to all caches in the cache domain, a medium popularity class comprising objects which should be distributed to a subset of the caches (Continued)

in the cache domain, and a low popularity class comprising objects which should not be distributed.

22 Claims, 6 Drawing Sheets

(51) Int. Cl.
  *G06F 17/30* (2006.01)
  *H04L 29/08* (2006.01)
(58) Field of Classification Search
  CPC .. H04L 67/28; H04L 67/2842; H04L 67/2847
  USPC ............... 709/201, 212, 213, 214, 215, 216
  See application file for complete search history.

(56) References Cited

U.S. PATENT DOCUMENTS

| | | | | |
|---|---|---|---|---|
| 8,069,435 | B1* | 11/2011 | Lai | G06Q 10/10 717/106 |
| 2003/0115346 | A1 | 6/2003 | McHenry et al. | |
| 2003/0167355 | A1* | 9/2003 | Smith | G06F 8/20 719/328 |
| 2007/0143242 | A1 | 6/2007 | Miller et al. | |
| 2008/0059282 | A1* | 3/2008 | Vallier | G06Q 30/0229 705/14.3 |
| 2009/0106108 | A1* | 4/2009 | Ku | G06Q 30/0256 705/14.54 |
| 2009/0119455 | A1 | 5/2009 | Kisel et al. | |
| 2009/0150917 | A1* | 6/2009 | Huffman | H04H 60/31 725/9 |
| 2010/0054535 | A1* | 3/2010 | Brown | G06K 9/00369 382/103 |
| 2010/0330899 | A1* | 12/2010 | Hong | H04H 20/63 455/3.01 |
| 2011/0088043 | A1* | 4/2011 | Lind | G06F 8/315 719/316 |

FOREIGN PATENT DOCUMENTS

| | | |
|---|---|---|
| EP | 1331791 A2 | 7/2003 |
| EP | 2053831 A1 | 4/2009 |

* cited by examiner

CACHING IN MOBILE NETWORKS

TECHNICAL FIELD

The present invention relates to a system for caching data in mobile packet data networks. In particular, the invention relates to a caching architecture suitable for optimising the distribution of cached data in a resource limited network.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

This can be understood with reference to FIG. 1, which is a schematic illustration of an exemplary architecture of a network 10 having an origin server 11 and a number of caches 12-16. Clients 17-19 are configured to receive files and/or streaming data from the origin server 11 or the caches 12-16.

In order to reduce the load on the origin server 11 and to save bandwidth in the delivery network 10, some of the content is stored in caches 12-16 closer to the end users 17-19. It is desirable to push these caches as close to the end user as possible.

For example, mobile network architectures generally comprise a Core Network (CN), to which are attached a number of radio access networks (RANs) in which terminals are connected to radio base stations (RBSs). The terminals may move and as they move they may be connected wirelessly to different RBSs. The transmission links between the RBSs and the rest of the network are usually rented and limited in capacity. One way of reducing the demands on these links is to use caching and, as described above, caching should preferably take place as close to the terminals as possible to minimize the need for transmission.

One problem with caching in the RAN (with the cache being a part of the RBS or any other RAN node) is that each cache will receive traffic from only a small population of terminals. In general, the content stored by a cache will be the content which has been requested by the end-users. If the population using the cache is small, the volume of cached content stored in that cache is small. Statistically, the probability that someone else wants to download the same content from that cache, i.e. the "cache hit rate", decreases with a smaller population. One large cache for a large population is therefore statistically more efficient than many small caches serving different smaller subsets of the population.

One way of addressing this problem is to generate a large "virtual" cache out of many small ones in the RBSs by copying content between the caches. This means that each small cache stores content from a large population (detected and cached by the other small caches), and this increases the local hit rate for popular content. This "pre-loading" of a cache can be seen as a form of predictive caching where the predictions are based on users in other caches.

Inevitably, this will result in duplication of content across many of the small caches, and the price to be paid is that the total storage size required by all of small caches together will increase. In addition, the transferred volume of data between the caches increases as the content is distributed. If the bandwidth between the caches is restricted, the additionally transferred data increases the load and may eventually cause congestion. Methods that can help to solve pooling and content distribution in a resource limited network are thus of importance.

SUMMARY

It is an object of the present invention to obviate at least some of the above disadvantages. In general, it is desirable to distribute content in small caches together forming a large, virtual cache in an efficient manner.

In accordance with one aspect of the present invention there is provided a cache manager for controlling the distribution of content stored in a set of caches called a cache domain of a packet data network (optionally a resource-limited network). The cache manager comprises an object monitor for receiving notifications from caches in the cache domain about data objects requested at those caches. An object database is configured to collate and store object information about the requested data objects, the object information including information about the caches at which the data objects have been requested and frequency with which the requests have been made. An object distributor is configured to identify objects for distribution on the basis of the object information and instruct the caches in the network to distribute data objects stored in those caches between themselves. The object information includes a popularity parameter for each object, and the object distributor is configured to classify the objects into one of at least three classes. The classes include a high popularity class comprising objects which should be distributed to all caches in the cache domain, a medium popularity class comprising objects which should be distributed to one or more subsets of the caches in the cache domain, and a low popularity class comprising objects which should not be distributed. It will be appreciated that the network may include one or more cache domains. The object distributor may be configured to instruct the caches to distribute the data objects using transmission capacity of the network which would otherwise remain unused.

The cache manager may further comprise a topology monitor for retrieving topology information about the topology of the cache domain. A topology database for storing said topology information may also be provided. The object distributor may be configured to make use of the topology information in the determination of how the objects should be distributed between the caches. In more detail, the object distributor may decide which objects should be stored at which caches, and when and from where a necessary fetch should occur (i.e. suitable times and places to distribute content from one or more local caches to one or more other local caches).

The topology information may include data relating to one or more of the following: a topology structure of the cache domain; bandwidth limitations of links between elements in the topology structure; storage capabilities of the caches; location of caches in the topology structure; current loads sustained by the links between elements in the topology structure; and transport types for data within the cache domain. In the case of storage capabilities of caches, it may be that objects with long lasting popularity should be stored on caches having a limited number of write operations (such as flash memory) and objects with very high popularities should not be stored on too few caches operating disks.

The topology information may include a daily load profile for each cache in the cache domain, the daily load profile indicating periods of high load and low load for that cache.

The object distributor may then be configured to allocate objects in the medium popularity class to caches in such a way that, at all times of the day, each object is stored on at least one cache in a low load period.

The object distributor may be configured to instruct the caches to distribute objects within the medium popularity class in such a way that more popular objects are distributed to a relatively high number of caches and less popular objects are distributed to a relatively low number of caches. The more popular objects in the medium popularity class may be distributed to many caches relatively close to users and less popular objects distributed to a few caches relatively central in the network.

The cache manager may be configured to control the distribution of the data objects between caches in the cache domain so that the cache domain functions as a large virtual cache.

The cache manager may be a discrete entity and include a communications system for communicating with elements in the network. It may be associated with one of the caches in the cache domain. Alternatively, the functionality of the cache manager may be distributed between network elements in the cache domain.

In accordance with another aspect of the present invention there is provided a method for optimising the distribution of data objects between caches in a cache domain of a resource limited network. User requests for data objects are received at caches in the cache domain. A notification is sent from the cache at which a request is received to a cache manager. The notification reports the user request and identifies the requested data object. At the cache manager, object information including the request frequency of each requested data object and the locations of the caches at which the requests were received is collated and stored. At the cache manager, objects for distribution within the cache domain are identified on the basis of the object information. Instructions are sent from the cache manager to the caches to distribute data objects stored in those caches between themselves. The data objects are distributed between the caches, optionally using transmission capacity of the network that would otherwise be unused. The object information includes a popularity parameter for the object, and the object distributor is configured to classify the object into one of at least three classes. The classes include a high popularity class comprising objects which should be distributed to all caches in the cache domain, a medium popularity class comprising objects which should be distributed to a subset of the caches in the cache domain, and a low popularity class comprising objects which should not be distributed.

The functionality of the cache manager may be distributed between network elements in the cache domain. The cache manager may take into account the topology of the network and/or the priority of the requested data objects and/or the frequency of requests for particular data objects when identifying the data objects for distribution. The network may be a mobile network, and the caches may be associated with or part of RNCs or RBSs.

The distribution may be implemented by forming a distribution queue of objects at each cache to be distributed to other caches, and placing the most-recently-used or most-frequently-used objects at the head of the distribution queue.

Messages including object popularity statistics may be sent from the caches to the cache controller.

In accordance with a further aspect of the present invention there is provided a computer program product comprising code adapted to be executed on a cache manager in a resource limited network. The code is operable to cause the cache manager to retrieve notifications from caches in a cache domain controlled by the cache manager, the notifications including details of data objects recently requested at those caches. The code is further operable to cause the cache manager to collate and store object information about the requested data objects, the object information including the location and popularity of requested data objects. The code is further operable to cause the cache manager to identify objects for distribution on the basis of the object information. The code is further operable to cause the network element to instruct the caches in the network to distribute data objects stored in those caches between themselves. The classes include a high popularity class comprising objects which should be distributed to all caches in the cache domain, a medium popularity class comprising objects which should be distributed to one or more subsets of the caches in the cache domain, and a low popularity class comprising objects which should not be distributed.

The invention also provides a computer program product as described above carried on a carrier medium.

BRIEF DESCRIPTION OF THE DRAWINGS

Some preferred embodiments will now be described by way of example only and with reference to the accompanying drawings, in which.

DETAILED DESCRIPTION

As discussed in the background above, when designing a caching system, there is typically a choice between a centrally placed cache and locally placed caches. In both cases there is little gain in transmission, either because the placement is high up in the network (in the case of the centrally placed cache) or because the hit rate becomes too low (in the case of local caches).

It is therefore desirable to combine the hit rate of a central cache with the transmission advantages of local caches. This can be achieved by the use of a "cache manager" which ensures that local caches enjoy a hit rate close or equal to that of a central cache. It does so by pre-loading the local caches according to global statistics (hence the high hit rate) and ensures that this preloading takes place at off-peak times (so as not to violate the bandwidth savings).

Effectively, therefore, a large, virtual cache is generated out of many small ones, in which the limitations of the transmission are taken into consideration. This can be achieved by "cache equalization" which distributes content between the caches. Each small cache stores content requested by a large population (detected and cached by the other small caches) and this increases the local hit rate for popular content. The object data distribution between the small caches can be seen as a form of predictive caching, where the predictions are based on the behaviour of users receiving data through other caches.

The price to be paid is that the volume of data transferred between the caches will increase. If the bandwidth is restricted between the caches, the additionally transferred data will increase the load loads and eventually cause congestion. Methods that can help to solve content distribution in a resource limited network are thus of importance.

Traffic varies over a typical 24 hour period and there is usually a significant amount of free capacity during night hours. Furthermore, even at peak hours there are periods during which free capacity is available. It is thus possible to distribute low volumes of high priority data objects during peak hours (e.g. during the day) and larger volumes of less critical data objects during off-peak hours (e.g., at night). In this context, a data object will be understood as meaning any set of data requested by a terminal and/or stored by a cache.

Figure 1:
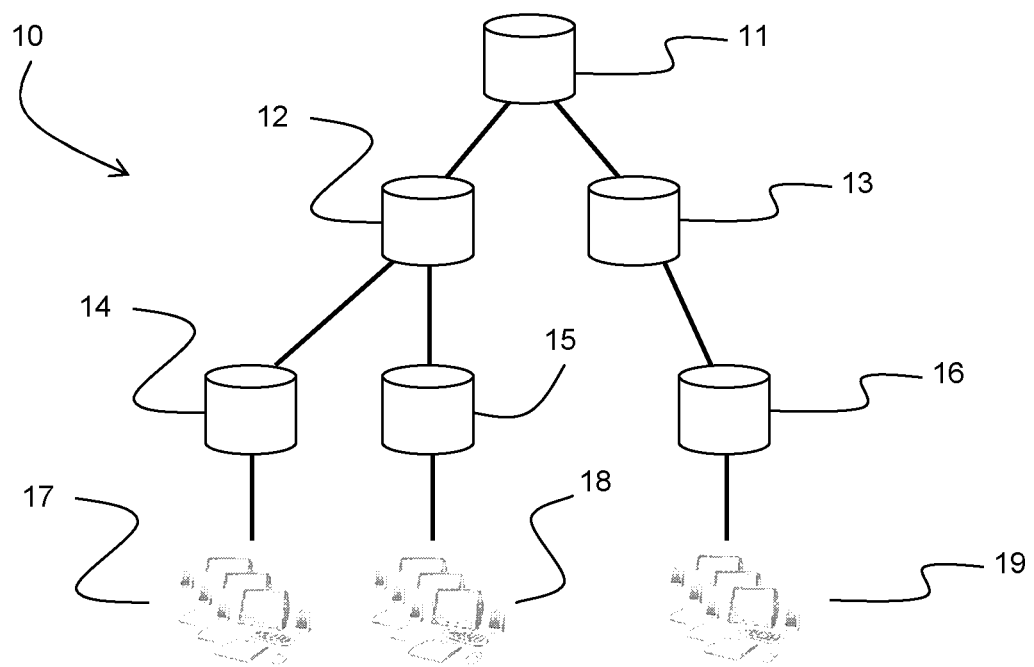
FIG. 1 is a schematic illustration of a network having an origin server and a number of caches.
Figure 2:
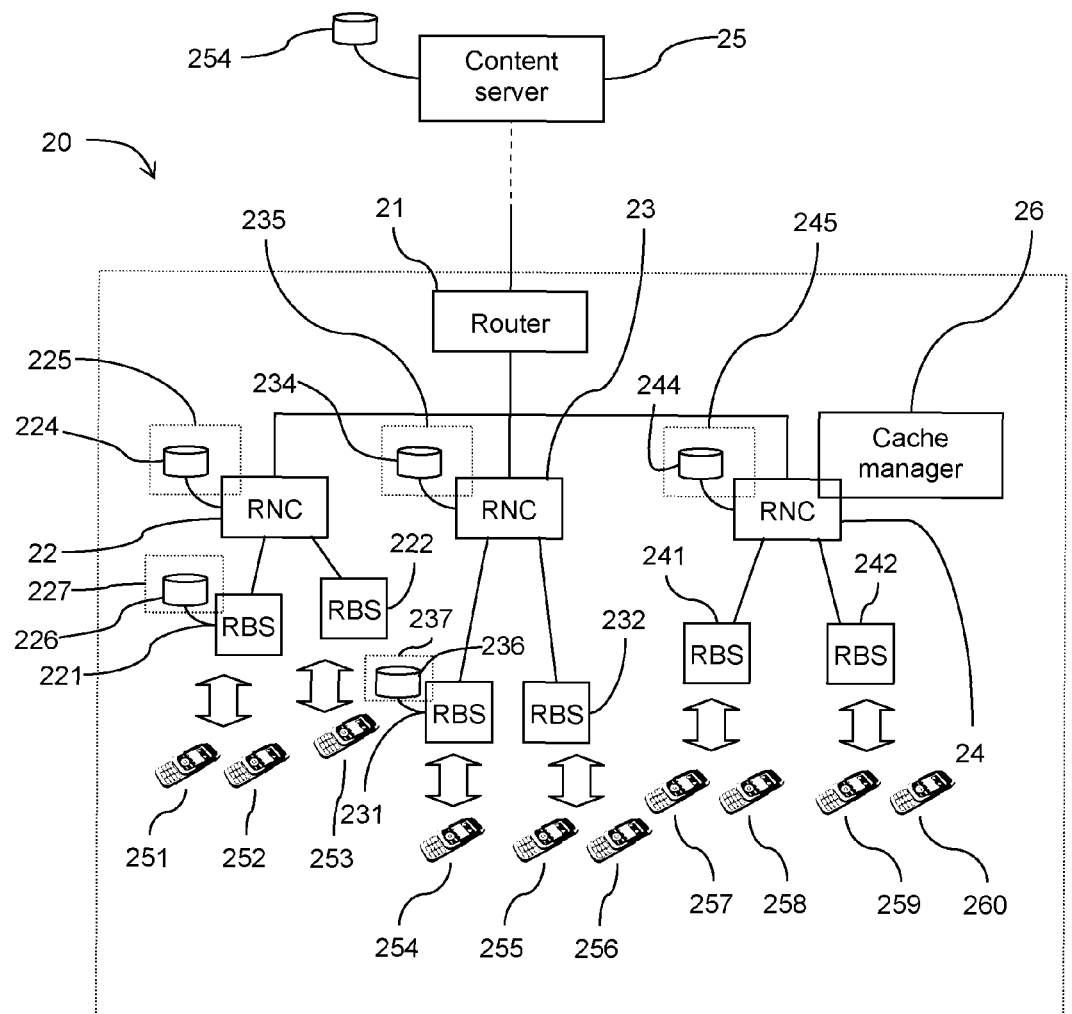
FIG. 2 is a schematic illustration of a Radio Access Network with Radio Network controllers and Radio Base Stations configured to act as caching servers.

FIG. 2 is a schematic illustration of a network 20 comprising a router 21 connected to three RNCs 22, 23, 24, each connected to RBSs 221, 222; 231, 232; 241, 242. Each RBS 221, 222, 231, 232, 241, 242 is connected to one or more terminals 251-260.

Each RNC 22, 23, 24 and some of the RBSs 221, 231 are associated with a cache storage unit 224, 234, 244, 226, 236 which may or may not be built into the RNCs or RBSs themselves. The RNCs 22, 23, 24 and router 21 are interconnected by transmission links. The RNCs (and those of the RBSs 221, 231 associated with cache storage units) are enabled to act as cache servers—i.e. each includes a logical entity that acts like an embedded proxy or uses deep packet inspection (DPI) to detect and direct end-user requests such as HTTP-GET. For convenience, the combination of the caching functionality in a cache server (e.g. RNC 22) and cache storage unit (e.g. 224) will be referred to as a "cache" in this document. This applies whether or not the cache storage unit is physically built in to the cache server. This means that there is effectively a cache 225, 235, 245, 227, 237 associated with each of the RNCs 22, 23, 24 and two of the RBSs 221, 231.

Although FIG. 2 shows a tree-topology with caches 225, 235, 245, 227, 237 operated by RNCs 22, 23, 24 and RBSs 221, 231, it will be appreciated that this is an example only. As will become apparent, the mechanisms for distributed cached data described herein may apply to many other topologies and scenarios where there is limited bandwidth between distributed caches 225, 235, 245, 227, 237.

As indicated above, the problem with such caches is related to the fact that, since each RNC 22, 23, 24 and RBS 221, 231 configured as a cache only supplies data to a limited number of terminals, the amount of traffic from each RNC 22, 23, 24 and RBS 221, 231 is small. The "hit-rate" from local cache traffic is small. The solution is to increase the hit rate by distributing content that is locally cached by any of the small caches 225, 235, 245, 227, 237 in the group to other small caches in that group. The caches in the group will then contain content requested at other caches and this will increase the hit rate.

Thus if content is requested by one of the terminals 251, this request passes through the RBS 221 and RNC 22 to which the terminal 251 is connected. Content data is delivered from a content server 25 (associated with a content storage unit 254) upstream in the network (for example in a core network, not shown) through the RNC 22 and RBS 221 to the terminal 251. As well as delivering the content data to the terminal 251, each of the RNC 22 and RBS 221 saves the content data in its associated cache storage unit 224, 226.

Then the next time the terminal 251 or 252 attached to that RBS requests that content, it can be extracted from the cache storage unit 226 by the RBS 221. When the content is requested by another terminal 253 attached to the same RNC 22, it can be extracted from the cache storage unit 224 (or from the cache storage unit 226 by the RBS 221) and supplied to the requesting terminal. In addition, the content data is copied to the other caches 235, 245, 237 in the group (maintained by the RNCs 23, 24 and other RBS 231) so that it can also be supplied, if requested, to any of the other terminals 254-260.

The problem with the distribution is that the links are limited in bandwidth, such that updates can cause congestion, in particular if they take place during busy hours. Therefore, the updates should be controlled so as to optimise the use of the bandwidth. This optimisation may include some or all of the following:

The use of otherwise unutilised transmission capacity (e.g. during off-peak times).

Potentially popular data is prioritised. For example, data objects for distribution can be queued and served as bandwidth becomes available and according to a queuing discipline based on data object popularity.

The distribution of rarely used data objects is restricted in cases where transmission bandwidth or storage capacity are limiting factors. Some data may not be distributed. If required, it can be extracted from the cache in which it has been saved.

Furthermore, it may be that a request is made via an RBS 221 for a data object not stored in the cache 227 associated with that RBS or in cache 225 associated with the RNC 22 of RBS 221, but which is stored in a nearby cache 235, 245, 237. In this situation the data object may be marked as high priority and fetched from the nearby RNC 235, 245, 237 immediately, rather than waiting for bandwidth to become available.

In order to control the distribution of data between the caches 225, 235, 245, 227, 237 a centralised cache manager unit 26 is operatively attached to one of the nodes in the network 20. In FIG. 2, it is shown as being associated with one of the RNCs 24, but it will be appreciated that it could also be associated with any of the RNCs 22, 23, 24 or any other network element such as the router 21, for example, or one of the RBSs. The cache manager unit 26 controls the spreading of information among a set of distributed caches. It will be appreciated that it is also possible to devise distributed cache manager solutions which provide the same functionality. The important feature is that the cache manager (whether it is a single unit 26 as shown in FIG. 2 or a distributed system) is able to optimise the distribution of data between caches 225, 235, 245, 227, 237.

The set of caches controlled by a particular manager may be considered as a "caching domain" (CD). CDs may be mutually exclusive or overlapping. The manager will be placed at or associated with a site with a central position in the topology of its domain, and it may be part of an RBS (or any other cache entity) at that site. A CD could correspond to a RAN, or may be only part of a RAN, or contain more than one RAN.

The cache manager 26 is aware of the popularities of all data objects requested at any RNC 22, 23, 24 (and RBSs 221, 231 associated with caches), all possible occurrences in caches 225, 235, 245, 227, 237 and bandwidth limitations in the network, and it is configured to use this information to manage cache updates in accordance with the above. In addition, it is configured to detect and redirect "failed" data requests from users such that requested data objects which cannot be delivered by a cache immediately adjacent to a user may be fetched from other caches in the same CD in preference to the content server 25. In this way the cache manager 26 can provide a (significant) transmission gain from the hop between the router 21 and higher layers in FIG. 2 and thus again use links more efficiently. It will be noted that this aspect is particularly attractive where the connections are provided by rented transmission or microwave links.

In other words, the cache manager 26 increase the "effective" hit rate of the small local caches 225, 235, 245 by distributing content among them during times when there is free bandwidth. The content to be pushed is determined by analyzing data requests from the different caches 225, 235, 245, 227, 237. Content which has been requested on one or more RBSs (and thus cached at the corresponding cache storage units 224, 234, 244, 226, 236) during peak hours will be distributed to the other caches (and thus available for delivery when requested on these RBSs) during off peak hours. In this way some traffic is moved from peak hours (the time when requests are made) to off peak hours (the time when the caches are pre-populated). The content of the different cache storage units 224, 234, 244, 226, 236 will thus diverge during the peak hours (since users at different RNCs 22, 23, 24 request different data objects) and converge to some extent during off peak hours (since the caches may be equalized by copying content in any cache to all caches). As will be explained in more detail below, not all content is necessarily equalised to all caches.

The cache manager knows where data objects are found and decides what to store on each cache. It is therefore possible that it may decide not to store a data object at all, or to store it but only at some caches but not at others. The choice of which caches to store in may depend on bandwidth, disc space, popularity in general and popularity in certain user groups. More details of how this choice is made are provided below.

Figure 3:
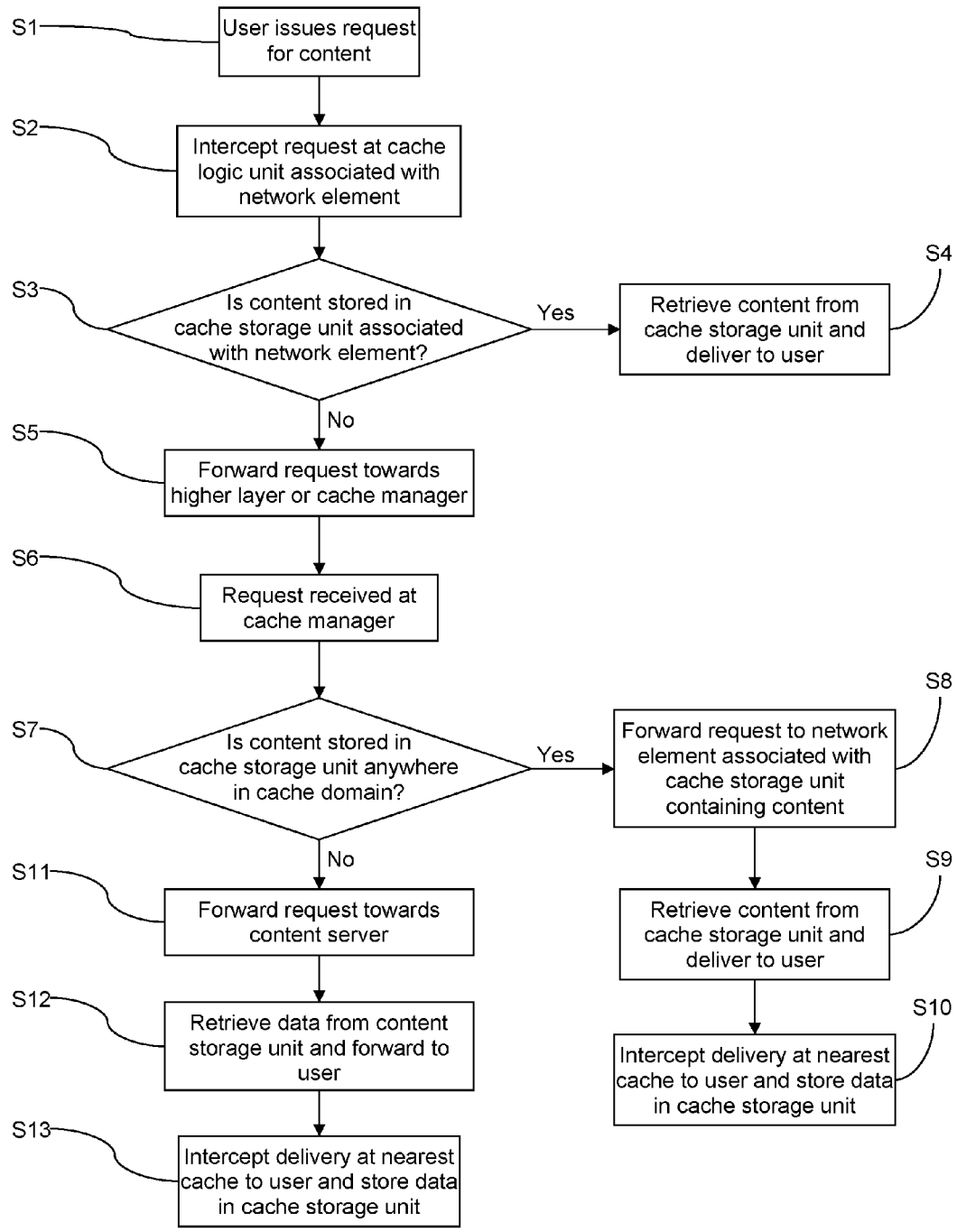
FIG. 3 is a flow diagram illustrating a procedure for serving a user request.

A typical procedure for serving a user request is shown in FIG. 3 and proceeds as follows:

S1 A user of a mobile terminal 251 issues a request (e.g. a HTTP-GET) for a piece of content.

S2 The request is intercepted at the site of the RBS 221 (or other network element) by a proxy/DPI logic unit 53 (see FIG. 5) of the cache 227 (which may or may not be built into the RBS 221).

S3 The logic unit 53 interrogates the cache storage unit 226 associated with the RBS 22 to see if the content is stored in that cache storage unit 226

S4 If so, this known as a "primary cache hit": the content is retrieved from the cache storage unit 226 and a local delivery to the terminal 251 takes place. In this case bandwidth savings have been made on all the links in FIG. 2.

S5 If there is a first cache miss, i.e. if the requested content is not available in the cache storage unit 226, the request will be forwarded, either to a "real" content server 25, to a higher layer proxy, or to the cache manager 26.

S6 The request is intercepted (on its path to the content server 25 or a higher layer proxy) or arrives at the cache manager 26 (as the chosen destination).

S7 The cache manager 26 analyses the request and examines if the requested content is found in any other local cache storage unit in the CD.

S8 If so (i.e. there is a secondary cache hit), the request is forwarded to whichever cache 235 contains the content.

S9 The content is retrieved from the cache storage unit 234 and delivered to the user.

S10 The first cache (RBS 221) may intercept the delivery and store the content locally in its associated cache storage unit 226 for future requests. In this case bandwidth savings are made on all links above the router 21 in FIG. 2. It will be appreciated that this can happen at any cache in the path, such as the RNC 22 with associated storage unit 224.

S11 If there is a secondary cache miss (i.e. if the requested content is not available in any of the other cache storage units in the CD), or if dictated by link load conditions towards other local caches, the request for the content is forwarded to the content server 25 or to some higher layer proxy. An alternative is to intercept the request at each higher layer cache with the manager as a last resort. Higher layer caches may EITHER have the content OR know of a cache below them where the content is to be found (in the same way as the manager knows about that). At least in the first case there is no point continuing to the manager.

S12 The content is delivered to the user from the content server 25 or higher layer proxy.

S13 The first cache (RBS 221)—or any other cache in the path (RNC 22) may intercept the delivery and store the content locally in its associated cache storage unit 226 for future requests.

In this way local caches 225, 235, 245, 227, 237 will be filled with content that has been requested by the local users. The content is delivered from different sources; (i) from the local cache itself (if it has been requested by other users of that RNC or RBS or site or pushed to that site during off-peak hours, which can be any period of time during which free bandwidth is available), (ii) from another local cache in the CD (if it has been requested by another user in the CD), or (iii) from more distant sources (if it has not been requested by any user in the CD). The largest transmission gains are obtained when content is fetched from the local cache, significant gains are obtained when content is fetched from another local cache, and small or no gains are obtained when the content is fetched from a distant source (although caching the data at this stage may lead to gains in the future).

It is thus clear that this process is most efficient if at least some of the local cache storage units 224, 234, 244, 226, 236 contain content that has been requested by other users in the entire CD, and which therefore with a high probability will be requested by the local users. If this is the case, primary cache hits (S4) will occur more frequently, reducing the need to carry out steps S7-S13 with their associated use of transmission links and bandwidth. In other words, this increases the fraction of requests for which the highest transmission gains (i) can be obtained.

In order to achieve this, the cache manager 26 collects information about such requests (which predominantly occur during peak hours) and then uses this information to pre-populate caches (predominantly during off peak hours).

For example, when a data object X is requested for the first time in the CD (e.g. by terminal 251), X is fetched from the content server 25 or a higher layer proxy and stored in the caches 225 and 227 through with the request is routed. If X is requested soon after by the same terminal 251 or another terminal 252 via the same RBS 221, it is fetched from the cache 227 or another terminal 253 via the same RNC 22, it is fetched from the cache 225 and delivered to the user. If X is requested soon afterwards via a different RNC 23 in the same CD, it is fetched from the cache storage unit 224 associated with the first RNC 22 and stored also in the cache storage unit 234 of the second RNC 23. Then, at some off peak time, the cache manager 26 ensures that X is distributed to some or all the caches 235, 245, 237 so that subsequent requests for X are served by the cache at which the request occurred.

It will be appreciated that the transport links between the RNCs may have different capacity. The central cache control 26 can thus decide if the distribution should be initiated immediately or if it should be delayed to lower traffic periods or night time. Another option is to use "lower than best-effort" priority class or a TCP that backs off faster than usual TCP in order to give the distribution traffic low background priority and not impact high priority traffic.

In order to implement this, the cache controller 26 maintains a counter for each object requested within its domain. Every time a new request is received for that object the counter is increased until a threshold is reached, at which point equalisation to all caches is initiated.

In practice, content may vary in popularity. Popular content should be distributed widely to all (or nearly all) the caches in a CD, but less popular content should be restricted to only a few caches. In order to monitor popularity, the central controller 26 keeps track of all requests for content from the UEs 251-260 in the mobile network or the area that is covered by the caches in its domain which can be thought of as forming a "pool". It also keeps track of access frequency to determine the popularity of the object.

The popularity of an object is used to determine how objects should be cached. It can be considered that there are three basic categories of distribution, although it will be appreciated that further subcategories may also be useful. The three basic distribution categories are:

(i) content distributed to all caches in a domain ("equalisation"),
(ii) content not cached at all, or
(iii) content distributed to one or more subsets of the caches ("pooling").

In the last case, the popularity of an object can also used to determine the number and location of caches in which that object should be stored. Moreover, similar statistics should be used when determining what objects should be deleted from caches.

As indicated above, content popularity may be classified initially as "high", "middle" or "low". Moreover:

equalisation applies to content of high popularity for which it is preferred to store copies in all caches,
pooling applies to content of medium popularity for which it is preferred to store copies in some caches and
no action at all applies to content of low popularity for which no copies are stored.

A simple pooling strategy is just to store a requested object in some or all caches of the network elements (RNC, RBS) via which the object has been delivered to the end user requesting that object. However, this simple approach is likely to result in deliveries over highly loaded links, uneven distribution of requests between the caches and/or deliveries over long distances.

A decision to pool an object involves selecting the cache(s) that should keep the content in question. As noted above, such a selection should preferably account for at least load (less loaded links are preferred), topology (shorter distances are preferred) and capacity.

The issue of link load includes sending the object to the cache (as a result of a decision to pool it) but, in particular, delivering the object from the cache (as a result of a user requesting the object). The first aspect is similar to equalisation and can be controlled to some extent, since the cache controller 26 can ensure that the object is sent to the cache during off-peak periods. The second aspect is different in that delivering the object from the cache to a user is likely to be carried out many times and at times which are determined by the users rather than by the system.

As previously discussed, traffic varies regularly over time. However, what has not previously been considered is the fact that the variation pattern differs between different nodes. For example, the variation may be greater for smaller areas and/or fewer users per node. These differences can be exploited to avoid peak loads for pooled objects by grouping caches by their peak hours, and storing objects on one or more caches in each group. Objects can then be fetched from whichever cache falls into a group not currently experiencing peak load.

Figure 4:
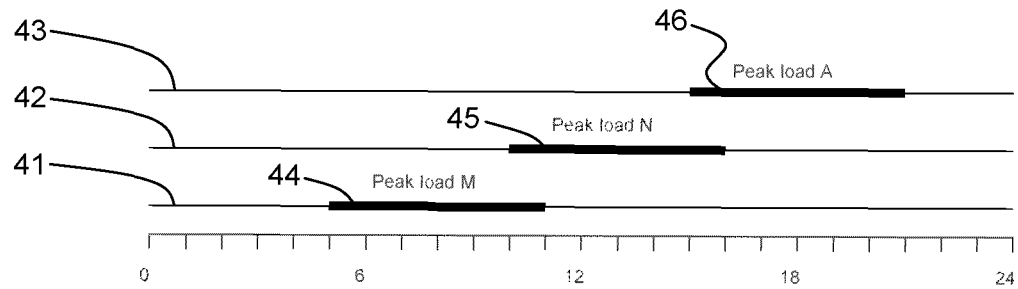
FIG. 4 is a schematic diagram illustrating different peak load periods of groups of caches.

This can be understood by reference to FIG. 4, which illustrates the average load pattern against time for three cache groups 41, 42, 43, each classified into one of morning (M), noon (N) and afternoon (A). The peak load 44 of the "morning" group 41 occurs between 5.00 and 11.00, that 45 of the "noon" group 42 between 10.00 and 16.00, and that 46 of the "afternoon" group 43 between 15.00 and 21.00. This can be envisaged, for example, by the difference between network elements in a residential district (where most caches are likely to form part of an "afternoon" group) and a business district (where most caches are likely to be part of a noon group). If an object is stored on at least one member of each such group, there will always be at least one cache containing that object which is unlikely to be suffering peak load. It will be understood that this example is easily extendable to more than three groups.

It is the task of a pooling arrangement mechanism in the cache controller 26 to identify such groups to enable pooling from "cheap" sources.

In addition, as discussed above, the "cost" of fetching an object from a cache (e.g. delay and bandwidth) may depend not only on the time but also on the topology. It may therefore be preferable to treat pooled objects differently depending on exactly how popular they are. For example, an object which is almost popular enough to be classified as "equalised" may advantageously be sent to many caches (many nodes in each group), while objects almost unpopular enough to be classified as "no action" may advantageously be kept in only one place (one node in each group). It will be noted that, in this arrangement, requests for popular objects will be distributed over more nodes than requests for less popular objects, and in this way the load on the different nodes becomes more evenly distributed.

Furthermore, the fewer places at which an object is stored, the more it will be preferred that this place is centrally located in the topology, and vice versa. This is because, the more nodes that contain the object in question, the higher the chance that a request can be served from a topologically "convenient" node.

It is thus also the task of the pooling arrangement mechanism to identify both a suitable number of instances of a pooled object, and the places in which the object should be stored. One implementation may be based on a number of groups. For example, with two groups, most (popular) and least (popular), objects in the first popularity group are stored at multiple, "remote" locations in each peak hour group while objects in the second popularity group are stored on a few "central" locations in each peak load group. It is clear that this example naturally extends to more than two groups.

In other words, in a tree topology, the more popular pooled objects should be stored at many "leaf" caches in each group, and thus be sure that at least one will be close to every access point. The less popular objects are stored at fewer caches, but those chosen are "root" caches so that, again, at least one is relatively close to each access point.

The pooling arrangement mechanism should group caches by the peak hours of their transmission links, classify the popularity of a pooled object, and match each such class to a subset of the nodes in each peak hour group such that less popular objects tend to be stored at fewer but more central locations while more popular objects tend to be stored at more but less central locations.

In addition to the daily load profiles and topology of the caches, it is also useful to take into account the storage technology of the caches themselves when determining the distribution. For example, flash memories are limited by their lifetimes, measured in number of write operations: a flash memory can only be overwritten a finite number of times. It would therefore be useful to store objects with "long term" popularity on such caches, but preferable to avoid (where possible) storing objects with quickly fading popularity which will need regular replacement. Disk storage, by contrast, has a longer lifetime but is limited by bandwidth, and therefore it is desirable to avoid storing too many popular objects on the same disk, as it may be impossible to deliver these objects to many users at the required rate.

Thus, as set out above, the caches to which pooled objects are distributed should be selected according to suitable criteria, which may include:
  Traffic load patterns over time;
  Geographical distribution over transmission infrastructure;
  Limitations of cache storage technology.

In order to effect the distribution, a reverse approach to that often used in cache deletion algorithms may be adopted. A common solution to the problem of which objects to delete in a full cache is to delete the least-recently-used (LRU) or least-frequently-used (LFU) objects. This approach can be reversed when in controlling distribution of objects such that the most-recently-used (MRU) or most-frequently-used (MFU) are distributed first. One may, for example, use "distribution queues" at caches (e.g. one per destination) in which (a) objects that are found in this cache and should be distributed to other caches are stored and from which (b) the current MRU- or MFU-object is transmitted using the free bandwidth (i.e. as background traffic relative to user requests which are foreground).

Figure 5:
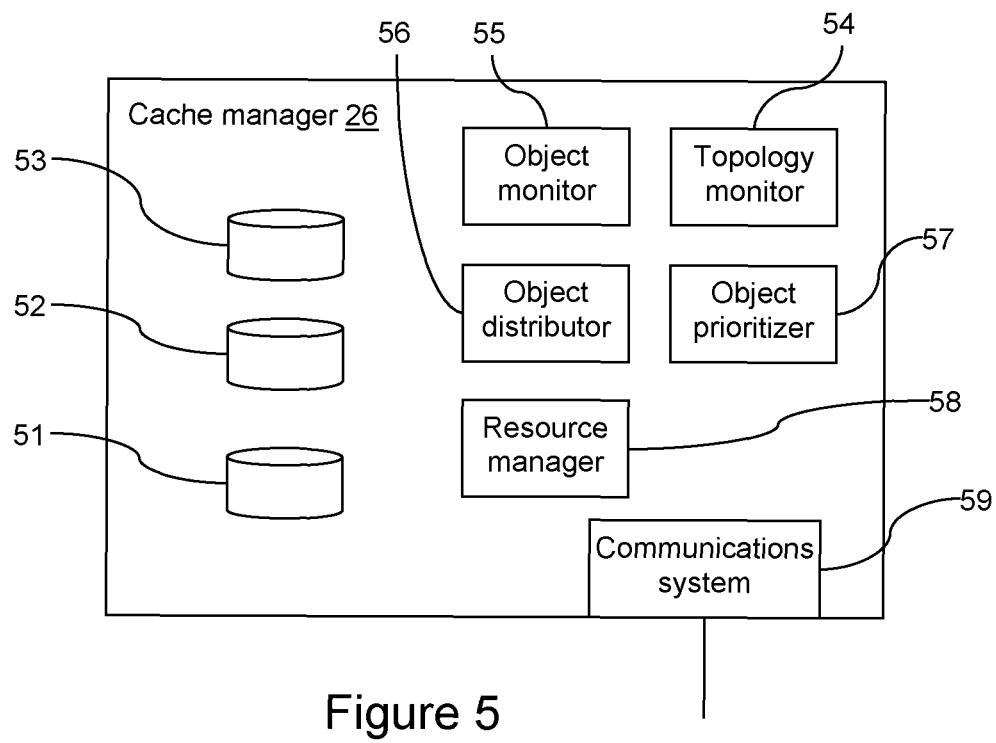
FIG. 5 is a schematic diagram illustrating an information model for a cache manager.

FIG. 5 is a schematic diagram illustrating a suitable information model for the cache manager 26. The manager includes the following information stores:
  A topology database 51 which may store information related to:
    Topology structure of CD: (e.g. tree, star, etc.)
    Bandwidth limitations of the links in the topology.
    Location of caches in the topology.
    Current link loads. The topology may support multiple traffic types (e.g. interactive traffic and conversational traffic). The link load monitors the load on the links between network elements to avoid the distribution of data objects causing congestion.
    Transport types: Multicast or unicast.
  An object data-base 52 which may store information related to:
    Locations and capabilities of data objects, i.e. the cache(s), if any, in which different data objects are stored.
    Popularity of data objects including historic information such as previous requests for the data object.
    Cached data objects, i.e. a list of recently cached data objects.
  An object distribution status database 53 which may include:
    Object distribution status: this should be a parameter providing information as how widely an object should be distributed (e.g. "should be equalised", "should be pooled to many caches", "should be pooled to few caches", "should not be distributed", etc.)
    Priority: data object distribution priority.
    Wall-clock time: timing information for determining the point at which distribution should start.

The functionality in the manager 26 may be divided into the following blocks:
  Topology monitor 54: a function that retrieves or collects information about the topology of the distributed caches 225, 235, 245, 227, 237.
  Object monitor 55: a function that retrieves or collects information from local caches 225, 235, 245, 227, 237 within the CD about recently cached data objects. The information may be obtained, for example, by regular polling of the caches, by subscribing to information from the caches, or by monitoring and analyzing the traffic between caches and servers. Other possibilities will be apparent to one skilled in the art.
  Object distributor 56: a function that identifies data objects which should be redistributed and performs the redistributions. These actions may be a continuous process or they may take place at a certain frequency, at certain times and/or at certain load conditions.
  Object prioritizer 57: a function that uses popularity statistics, for example, to estimate the probability of multiple requests of an data object in order to prioritize between different data objects which have been identified for redistribution.
  Resource manager 58: a function that ensures that redistributions do not drive the network into overload. This can be achieved, for example, by limiting the number of data objects to be redistributed for a single specific off-peak hour but then continue distribution the next off-peak hours or, when applicable, by selecting from which cache an data object should be delivered.
  Communications system 59: a function that controls communication with other network elements in the CD.

It will be appreciated that the logical elements shown in FIG. 5 all interact with each other to enable the cache manager 26 to perform the functions described. In particular, the pooling arrangement mechanism described above effectively includes the functionality of the topology monitor, object distributor, object prioritiser, object monitor and resource manager.

In addition (and not shown in FIG. 5), there may be a request match maker, the function of which is to redirect requests from caches where a miss occurred to caches where the data object is cached and thus a hit will occur. In this way bandwidth can be saved at substantial bandwidth savings even in the presence of cache equalization delays.

Figure 6:
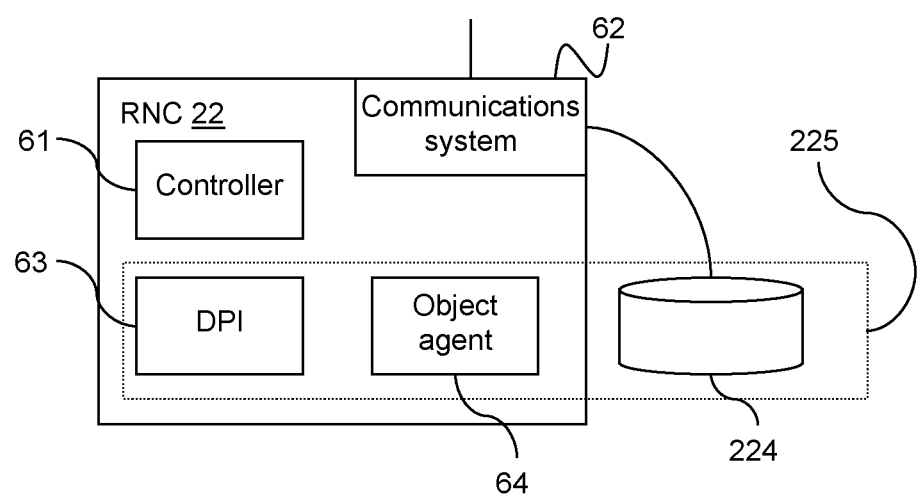
FIG. 6 is a schematic diagram of an RNC configured to act as a cache server.

FIG. 6 is a schematic diagram illustrating the functionality of an RNC 22 and associated cache storage unit 224 acting as a cache 225. It will be appreciated that a cache can be provided at, or associated with, any suitable network element as well as or instead of a RNC, and that functions described as being operated by the RNC 22 may be operated by a separate entity.

The RNC 22 includes a controller 61 and communications system 62 for operating the usual functions of an RNC (e.g.

communications with RBSs, routers, forwarding traffic etc.). Where the RNC is configured to act as a cache 225 it is also associated with a cache storage unit 224, and includes two further functions; a DPI 53 and an object agent 54, described below.

The functionality in the cache 225 may be described as:

DPI 63: a function that inspects passing packets to find those packets that include requests for information such as HTTP-GET. It can be implemented as an HTTP-proxy or a Deep Packet Inspection device.

Cache storage unit 224: a storage space such as a hard-disk. This may be separate from the RNC 22 (as shown in FIG. 6) or an integral part of the RNC 22.

Object agent 64: an interface towards the cache manager 26 (via the communications system 62 if the cache manager 26 is not part of the RNC 22). The object agent 64 can also distribute information over a TCP/UDP session with low priority such that other traffic (e.g. interactive and conversational) is not disturbed during the transfer. This can be done in two ways: Using a "lower than best-effort" priority class, or a TCP session that backs off faster that usual TCP.

Figure 7:
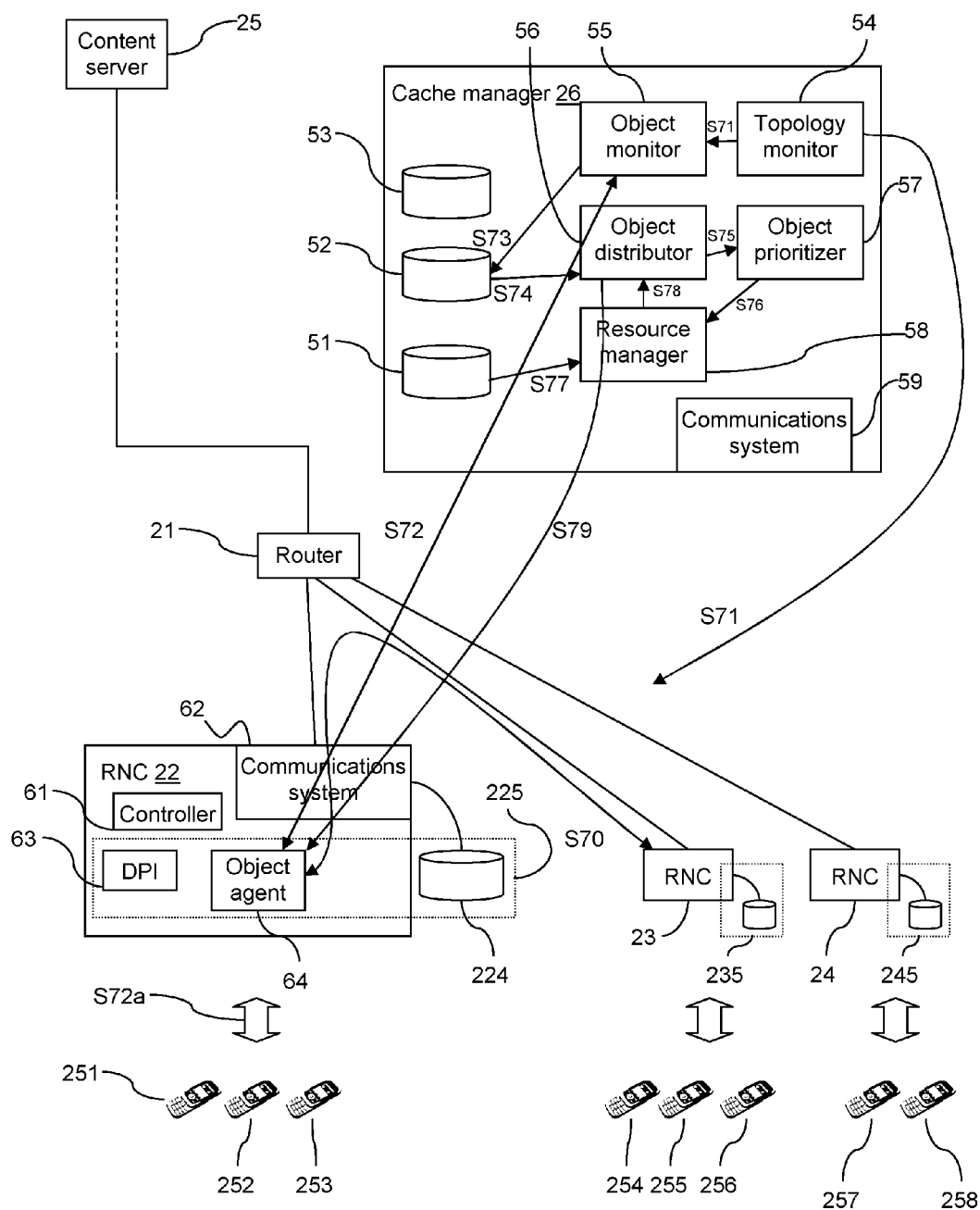
FIG. 7 is a schematic diagram illustrating the management of cached data in the network of FIG. 2.

FIG. 7 is a schematic diagram illustrating one example of how the distribution of cached data can be managed in the network shown in FIG. 2. The RBSs and some of the terminals of FIG. 2 have been left out of FIG. 7 for reasons of space. The information flow is as follows:

S71 The topology monitor 54 monitors the topology of the network elements in the CD, for example using the Simple Network Management Protocol (SNMP), and stores the updated knowledge into the topology database 51.

S72 The object monitor 55 continuously fetches from the local caches 225, 235, 245, (and caches 227 and 237 not shown in FIG. 7), via the object agent 64 in those caches or by intercepting content requests, information about data objects recently stored in the caches 225, 235, 245, 227, 237 (for example as a result of a request S72a from a terminal 251).

S73 This information is stored into the object database 52.

S74 At a specific time or at specific load condition, the object distributor 56 inspects the object database 52 for new data objects and compiles a list of new data objects.

S75 The list of new data objects is passed to the object-prioritizer 57. The "object prioritizer" assigns priorities to the data objects and creates a prioritized list of data objects.

S76 The prioritized list is then transferred to the resource manager 58.

S77 The resource manager 58 fetches information from the topology database 51 about the topology status and sets the number of data objects to be transferred based on the topology information.

S78 A new list is then transferred back to the object distributor 56.

S79 Based on the processed list, the object distributor 56 creates a set of object distribution requests which are sent to the object agent 64 in one or more of the caches 225, 235, 245. Several requests can be sent which may be distributed over longer periods of time. The requests can include information about the source (a local cache at which the data object is found), the sink(s) (the local caches at which the data object should be stored) and about distribution method (unicast, multicast).

S80 The object agent 64 initiates transfers after receiving such requests. Such transfers may be implemented in many ways. As a first, straightforward example, the object distributor 56 at the manager may instruct object agents at destination caches to issue ordinary request message (i.e. HTTP-GET messages) and to ensure that these requests be sent to the object agents of the source local caches. As a second, more advanced, example the object distributor 46 at the manager may instruct object agents at source caches to set up broadcasts and instruct object agents at specified sets of destination caches to listen to these broadcasts.

The sequence above is an example of updates in a distributed caching architecture. As a complementary example, some of the functionally provided by the object monitor 55, object distributor 56, object prioritizer 57 and resource manager 59 may be implemented as one or more object transfer queues (OTQs).

OTQs contain data objects (or references to data objects) which are to be updated at one or more caches. The requests are served according to a priority based discipline where the most urgent updates are served first.

A data object in an OTQ may be an update including a pointer to a source (e.g. cache 225) and one or more pointers to receivers (e.g. caches 235, 245). One can envisage a single, global OTQ; one OTQ for fetching data objects from sources and another OTQ for dispatching data objects to receivers; or, optionally, a "fetch-OTQ" and a "dispatch-OTQ" for each local cache. It will be noted that separate queues are a logical notation rather than a physical implementation.

The object monitor 55 and object prioritizer 57 may be responsible for adding elements to the OTQs as new or updated data objects are observed. Queued entries may be replaced or preceded by other entries as more recent updates or more popular data objects are observed.

The resource manager 58 may supervise the traffic from each cache and activate the first entry in the fetch-OTQ of the corresponding cache when the traffic is below a certain threshold. Similarly, it may supervise the traffic to each cache and activate the first entry in the dispatch-OTQ of the corresponding cache when the traffic is below a certain threshold. Data objects which have been fetched but not yet dispatched would in the meantime be stored temporarily by the manager itself or by any intermediate cache with free space. This "global stand-by scheduling" should use all available bandwidth in order to minimise the transfer times and thus maximise the hit rates at the local caches.

As noted above, the term "stand-by" is related to the fact that requests are served as free capacity (which may be identified, for example, in terms of link load) is detected. The meaning may, however, be expanded and not only refer to requests but to single packets. This can be accomplished either by traffic differentiation in MPLS, in the link scheduling at the two end points or by means of a "soft" end-to-end protocol which yields to congestion much faster and stronger than other traffics (i.e., a protocol which is more responsive than TCP).

It will be appreciated that there is a sense in which all local caches 225, 235, 245 have agents, that is to say "slave agents" which listen to and obey a "master", i.e. the cache manager 26. A distributed implementation of the cache manager may extend these local slave agents or implement new local managers as "master agents".

Furthermore, it will be appreciated that slightly different modes of communication between RNCs 22, 23, 24 and RBSs 221, 231 and cache manager 26 are possible. For example, consider two cases, a primary cache hit and a primary cache miss (as in steps S4 and S5 of FIG. 3), in a local cache at RNC 22.

If there is a hit (i.e. content is requested which is present in the cache storage unit 224), the RNC 22 may or may not inform the cache manager 26 of the request due to size or security reasons. Some data objects may contain viruses or that the portal is not trusted. This can be described by local policy-rules in the cache. Informing the manager may help the manager to improve its plans for placing content at other caches (more popular content should perhaps be shared to other caches sooner) and, in particular, to improve its suggestions for identifying data objects which can be deleted when caches are full (less popular content should go first when a cache is full and the "global" view of the cache manager may help in identifying these data objects in a statistically accurate way).

If there as a miss (i.e. the requested content is not present in the cache storage unit 224) the requesting local cache could fetch the content from somewhere else (typically a higher layer cache or the content server 25) and then inform the cache manager 26 about its new acquisition. Alternatively, prior to the request it could ask the cache manager 26 where the content should be fetched from, and the cache manager 26 can direct the RNC 22 to another local cache. In a further alternative, all requests could be handled through the cache manager 26 so that the requesting, local cache is unaware of the source of the content.

The arrangements described above enable a distributed caching architecture to perform a similar function to a large cache, even where resources are limited. High caching hit-rates can be provided independently of where in the topology the cache is located.

The updates of the caches can be performed without disturbing other traffic, e.g. during non-busy hours, to ensure that the distribution does not require more capacity in the transport network.

It should be apparent that the approach described above enables a distributed caching architecture to perform in a similar manner to a large central cache. High caching hit-rates can be provided independently of where in the topology the cache is located. The updates of the caches are performed without disturbing other traffic, e.g. during non-busy hours, to ensure that the distribution does not require more capacity in the transport network. The mechanism is optimal for low frequency content requests because content can be fetched from the pool of caches at all connected RNC.

Furthermore, by subdividing the popularity of objects the distribution can be optimised. When the frequency of a particular content is popular enough to be distributed to all caches in the RNC, a mechanism initiates the equalization mechanism that distributes the identified popular object to all caches in the RNC.

The invention claimed is:

1. A cache manager for controlling distribution of content stored in caches in a cache domain in a packet data network, the cache manager comprising:
   an object monitor configured to receive notifications from caches in the cache domain about data objects requested at a respective cache;
   an object database configured to collate and store object information about the requested data objects, the object information including information about the caches at which the data objects have been requested and frequency with which the requests have been made;
   an object distributor configured to:
      classify each requested data object into one of at least three classes based on the object information, the classes including:
         a high popularity class comprising objects which should be distributed to all caches in the cache domain;
         a medium popularity class comprising objects which should be distributed to one or more subsets of the caches in the cache domain; and
         a low popularity class comprising objects which should not be distributed;
      identify data objects for distribution in accordance with the classification; and
      instruct the caches in the cache domain to distribute the identified data objects stored in those caches between themselves.

2. The cache manager of claim 1, further comprising:
   a topology monitor configured to retrieve topology information about the topology of the cache domain;
   a topology database configured to store the topology information;
   wherein the topology information includes data relating to one or more of the following:
      a topology structure of the cache domain;
      bandwidth limitations of links between elements in the topology structure;
      storage capabilities of the caches;
      location of caches in the topology structure;
      current loads sustained by the links between elements in the topology structure; and
      transport types for data within the cache domain;
   wherein the object distributor is configured to make use of the topology information in the determination of how the objects should be distributed between the caches.

3. The cache manager of claim 2:
   wherein the topology information includes a daily load profile for each cache in the cache domain, the daily load profile indicating periods of high load and low load for that cache;
   wherein the object distributor is configured to allocate objects in the medium popularity class to caches in such a way that, at all times of the day, each object is stored on at least one cache in a low load period.

4. The cache manager of claim 1, wherein the object distributor is configured to instruct caches in the cache domain to distribute objects within the medium popularity class in such a way that more popular objects are distributed to a relatively high number of caches and less popular objects are distributed to a relatively low number of caches.

5. The cache manager of claim 4, wherein the more popular objects in the medium popularity class are distributed to many caches relatively close to users and less popular objects are distributed to a few caches relatively central in the network.

6. The cache manager of claim 1, wherein the cache manager is configured to control the distribution of the data objects between caches in the cache domain so that the cache domain functions as a large virtual cache.

7. The cache manager of claim 1, wherein the packet data network is a mobile network.

8. The cache manager of claim 1, wherein the cache manager is a discrete entity and includes a communications system for communicating with elements in the packet data network.

9. The cache manager of claim 8, wherein the cache manager is associated with one of the caches in the cache domain.

10. The cache manager of claim 1, wherein functionality of the cache manager is distributed among network elements in the cache domain.

11. A method for optimizing distribution of data objects between caches in a cache domain of a resource limited network, the method comprising:

receiving, at a cache manager, a notification from at least one of the caches in the cache domain, the notification reporting that the cache has received one or more user requests and one or more requested data object;

at the cache manager, collating and storing object information including the request frequency of each requested data object and the locations of the caches at which the requests were received;

classifying, by an object distributor, the requested data object into one of at least three classes based on the object information, the classes including:
- a high popularity class comprising objects which should be distributed to all caches in the cache domain;
- a medium popularity class comprising objects which should be distributed to one or more subsets of the caches in the cache domain; and
- a low popularity class comprising objects which should not be distributed;

at the cache manager, identifying data objects for distribution within the cache domain in accordance with the classification;

sending instructions from the cache manager to the caches to distribute the identified data objects stored in those caches between themselves; and distributing the identified data objects between the caches by the object distributor.

12. The method of claim 11, wherein the objects are distributed using transmission capacity of the network that would otherwise be unused.

13. The method of claim 11, wherein the cache manager takes into account at least one of the following when identifying the data objects for distribution:
- topology of the network;
- priority of the requested data objects;
- frequency of requests for particular data objects.

14. The method of claim 11, wherein the cache manager:
- takes into account a daily load profile of each cache in the cache domain, the daily load profile indicating periods of high load and low load for that cache;
- allocates objects in the medium popularity class to caches in such a way that, at all times of the day, the object is stored on at least one cache in a low load period.

15. The method of claim 11, further comprising distributing objects within the medium popularity class in such a way that more popular objects are distributed to a relatively high number of caches and less popular objects are distributed to a relatively low number of caches.

16. The method of claim 15, wherein the more popular objects in the medium popularity class are distributed to many caches relatively close to users and less popular objects are distributed to a few caches relatively central in the network.

17. The method of claim 11, wherein the caches are associated with or part of Radio Network Controllers, Radio Base Stations, or other Radio Access Network nodes.

18. The method of claim 11, wherein the data objects are distributed between the caches during off-peak periods.

19. The method of claim 11, wherein functionality of the cache manager is distributed between network elements in the cache domain.

20. The method of claim 11, further comprising:
- at each cache, forming a distribution queue of objects to be distributed to other caches;
- placing most-recently-used or most-frequently-used objects at a head of the distribution queue.

21. The method of claim 11, further comprising sending messages including object popularity statistics from the caches to the cache controller.

22. A computer program product stored in a non-transitory computer readable medium for controlling a cache manager in a resource limited network, the computer program product comprising software instructions which, when run on the cache manager, causes the cache manager to:
- retrieve notifications from caches in a cache domain controlled by the cache manager, the notifications including details of data objects recently requested at a respective cache;
- collate and store object information about the requested data objects, the object information including the locations of the caches at which the requests were received and popularity of requested data objects;
- classify each requested data object into one of at least three classes, the classes including:
  - a high popularity class comprising objects which should be distributed to all caches in the cache domain;
  - a medium popularity class comprising objects which should be distributed to one or more subsets of the caches in the cache domain; and
  - a low popularity class comprising objects which should not be distributed;
- identify data objects for distribution on the basis of the classification; and
- instruct the caches in the network to distribute the identified data objects stored in those caches between themselves.

* * * * *